United States Patent [19]
Ukon

[11] Patent Number: 5,301,007
[45] Date of Patent: Apr. 5, 1994

[54] MICROSCOPIC SPECTROMETER

[75] Inventor: Juichiro Ukon, Miyanohigashi, Japan

[73] Assignee: Horiba Ltd., Kyoto, Japan

[21] Appl. No.: 607,313

[22] Filed: Oct. 31, 1990

[30] Foreign Application Priority Data

Nov. 3, 1989 [JP] Japan ................... 1-286893

[51] Int. Cl.$^5$ .................. G01J 3/28; G01N 21/00
[52] U.S. Cl. ........................ 356/326; 356/72
[58] Field of Search ............ 356/326, 317, 419, 328, 356/334, 72; 350/523; 359/809, 810, 372, 373, 389, 385

[56] References Cited

U.S. PATENT DOCUMENTS

| | | | |
|---|---|---|---|
| 3,502,413 | 3/1970 | Lightner | 356/326 |
| 4,662,747 | 5/1987 | Isaacson et al. | 356/317 |
| 4,810,077 | 3/1989 | Sting | 350/523 |
| 4,917,492 | 4/1990 | Koishi | 356/328 |
| 4,929,078 | 5/1990 | Harmon | 356/326 |
| 4,971,437 | 11/1990 | Van Gijzel | 356/419 |

Primary Examiner—Vincent P. McGraw
Assistant Examiner—K. P. Hantis
Attorney, Agent, or Firm—Price, Gess & Ubell

[57] ABSTRACT

A microscopic spectrometer having a separate optical path for masking light from a sample for spectrometric measurements. In the preferred embodiment, a beam splitter is disposed behind an object lens to form two branched optical paths. One of the optical paths is provided with masks at a point of focus along the path, allowing part of the image to be masked. The second optical path allows optical throughput and observation of the entire image. These two optical paths are rejoined, and a final image is obtained for visual inspection by synthesizing the two optical paths.

18 Claims, 4 Drawing Sheets

MICROSCOPIC SPECTROMETER

FIELD OF THE INVENTION

The present invention relates to spectrometers and, more particularly, to microscopic spectrometers.

BACKGROUND OF THE INVENTION

A conventional microscopic spectrometer is shown in FIG. 4. Therein, light from a light source 1 is incident upon a sample 2. The light transmitted through sample 2 is focused by an object lens 3 to form an enlarged image on an image surface 4. The image surface 4 is enlarged and focused into a second image through a relay lens 5, which allows the image surface 4 to be observed by an eyepiece 6.

When the spectrometric measurement is conducted, the light is introduced into the spectrometrical measurement system 8 by placing a mirror 7 between the image surface 4 and the relay lens 5. The mirror 7 changes the optical path so that the light travels through the spectrometrical measurement system 8, thereby allowing a spectrometric analysis and the production of a display 9.

An example of an object to be spectrometrically measured is illustrated in FIG. 5. The sample 2 may include several areas A, B, and C. Oftentimes the user does not wish to spectrometrically measure the entire sample 2, but prefers to merely measure the area A alone.

The spectrometrical measurement is made by masking the image surface 4. This masking operation is shown in FIG. 5. The image surface 4 is provided with masks 10 and 11 which are disposed one on top of the other. The masks 10 and 11 are opaque and provide an optical throughput only where neither mask 10 nor mask 11 have a portion. Masks 10 or 11 used in combination mask out all portions of the sample 2 which are not meant to be measured.

As shown in FIG. 6, masks 10 and 11 are movable along axes which are respectively perpendicular. Thereby, any area A within the sample may be selected, and the rest of the sample 2 is masked. The masks 10, 11 provide an optical throughput and thereby allows a measurement to be conducted.

Because the conventional microscopic spectrometer depicted in FIGS. 4-7 mask all areas of the sample 2 other than the area A to be measured, it is impossible to reconfirm a positional relation of the area A with respect to the entire image of the sample 2 through simple visual observation. Since the physical masks 10, 11 block out sample 2 except for the area A, the positional relationship of the area A is lost. This difficulty becomes further exaggerated as the object to be measured becomes more minute or complicated, i.e., in a semiconductor chip or cellular tissue.

In order to reconfirm the positional relationship of an area A which is being measured, the masks 10, 11 must be removed or the slit allowing optical throughput must be moved. Once the mask is removed or the slit is moved, it is extremely difficult to reproduce the exact position of the masks 10, 11, and thereby reproduce the exact measurement that is being taken. Thus, the accuracy of the spectrometrical measurement is greatly decreased.

OBJECTS OF THE INVENTION

It is therefore an object of the present invention to provide an improved microscopic spectrometer;

It is a further object of the invention to provide a microscopic spectrometer which is capable of accurately confirming a position of an area being measured within an entire sample;

It is yet a further object of the invention to provide a microscopic spectrometer capable of confirming a position of an area within an entire sample being measured without moving masks, and thereby remarkably shortening the time required for measurement; and It is yet a still further object of the invention to provide a microscopic spectrometer capable of confirming the position of an area Within an entire sample to be measured without moving masks, and thereby allowing a highly accurate spectrometrical measurement.

SUMMARY OF THE INVENTION

The above-shown objects are achieved by the present invention, which may generally be described as a microscopic spectrometer having a separate optical path for masking a sample and obtaining spectrometrical measurements. In the preferred embodiment, a beam splitter is disposed behind an object lens to form two branched optical paths. One of the optical paths is provided with masks at a point of focus along the path, allowing part of the image to be masked. The second optical path allows optical throughput and observation of the entire image.

In the preferred embodiment these two optical paths are rejoined. Thus, a final image is obtained for visual inspection by synthesizing the two optical paths.

By branching the beam into separate optical paths, the present invention allows a masking of merely the optical path being utilized for spectrometrical measurement. The user is still free to visualize the entire sample along the second optical path.

The positional relationship of the area being measured is determined with respect to the entire sample by viewing both optical paths together. The masking of the sample for spectrometrical measurement does not have to be removed, and a repeatable and accurate measurement can be conducted.

In the system illustrated in the preferred embodiment, only the masked optical path is introduced into the spectrometrical measurement system to conduct an analysis. This serves an additional purpose of shortening the time required for measurement.

BRIEF DESCRIPTION OF THE DRAWINGS

The present invention, both as to its organization and manner of operation, together with further objects and advantages, may be understood by reference to the following description, taken in connection with the accompanying drawings.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
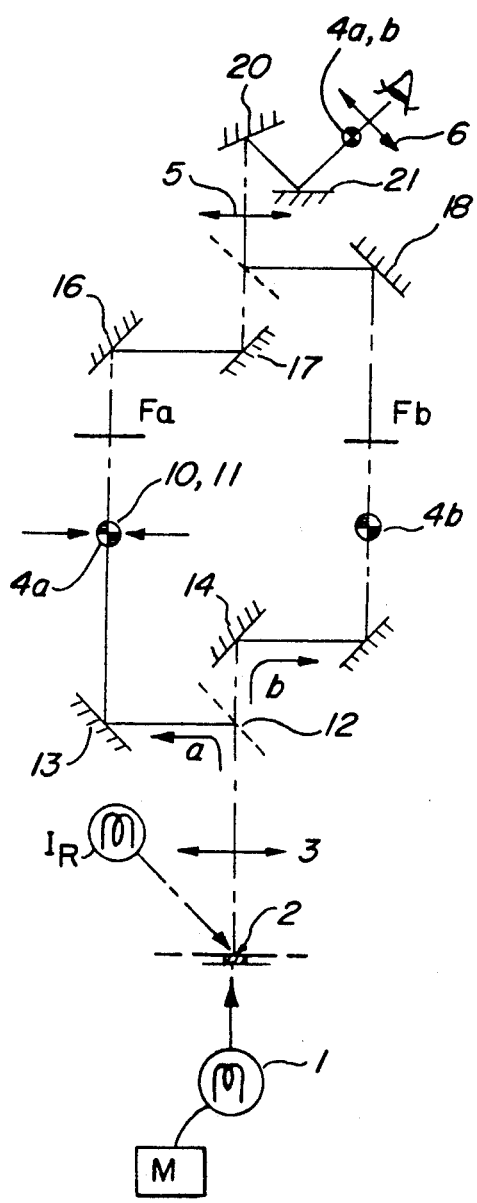
FIG. 1 is an illustration of an optical arrangement plan utilized by the preferred embodiment.
Figure 2:
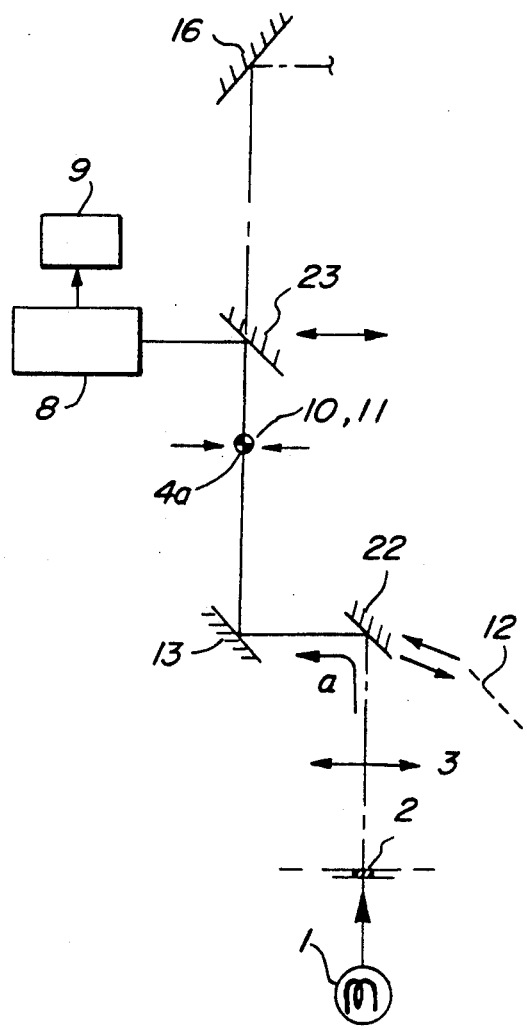
FIG. 2 is an illustration of an optical arrangement plan utilized by the preferred embodiment.

A preferred embodiment of a microscopic spectrometer according to the present invention is illustrated in FIGS. 1 and 2. Therein, light from light source 1 is incident upon sample 2. In this embodiment, the light source 1 produces light within the visible spectrum.

The sample 2 transmits light from the light source 1, and may be further excited and produce phenomena such as fluorescence or phosphorescence. The combination of the transmitted light and any radiation-producing phenomena of the sample 2 sends light through the object lens 3 to the beam splitter 12. The beam splitter 12 divides the light between two optical paths a and b.

The light passing along optical path a is reflected by mirror 13 and focused into an image at focal point 4a of object lens 3. Masks 10, 11 are placed at focal point 4a to mask the image of the sample created at focal point 4a. By altering the position of masks 10 and 11 along a plane perpendicular to the optical axis, it is possible to choose a target area A within the sample 2 to be measured. The rest of the sample 2 will be blocked by masks 10, 11. Other masking means can be utilized at point 4a, such as circular pinhole-type masks or light valves, and the invention should in no way be limited to the embodied masks 10, 11, which are merely used for illustration.

Optical path b takes the light transmitted by the beam splitter 12 and, after reflection by mirrors 14, 15, allows an image to be focused at point 4b, the focal point of the object lens 3. Since there is no masking mechanism at focal point 4b, the entire image of the sample 2 will be passed.

When used for recombination, the image at point 4a which is allowed to pass by masks 10, 11 along optical path a is reflected by mirrors 16, 17, and light from the image 4a is incident upon optical element 19. Furthermore, the image 4b along optical path b is reflected by mirror 18, and is incident on optical element 19.

Optical element 19 combines optical paths a and b into one synthesized optical path. The optical element 19 directs light through relay lens 5 to be reflected from mirrors 20, 21. An image is produced at point 4ab, which is a synthetic image of the combination of the images produced along optical paths a and b.

The image at focal point 4ab is observed by the user through visualizing means such as eyepiece 6. In the user view of the image, the area A will exhibit a brightness greater than the portions which have been masked. This is due to the fact that the image created along optical path a which has not been masked, i.e., area A on sample 2, will have an additive luminesce with the overall image of sample 2 viewed along optical path b, while the masked areas will not add their luminescence. Thus, the synthetic image created at focal point 4ab will seem brighter at area A than along the rest of the image. Thus, the user can easily verify the position of masks 10, 11, or the area A to be spectrometrically measured with respect to sample 2.

Filters $F_a$, $F_b$ having different spectrometric characteristics may be introduced into the two optical paths a, b to further enhance the area A from the sample 2 when viewed by the viewer through eyepiece 6. When filters $F_a$, $F_b$ of different colors or different spectrometric characteristics are introduced into the optical paths a, b, the area A will have a different color than the overall sample when viewed by the viewer.

Once the position of the area A to be measured has been confirmed, the preferred embodiment of the invention replaces the beam splitter 12 (shown in FIG. 1) with a total reflection mirror 2 (shown in FIG. 2). A second mirror 23 is also introduced along with mirror 22 to convert the optical path a so that the optical path a flows to the spectrometrical measurement system 8.

In the preferred embodiment, mirror 23 is disposed after the focal point 4a and masks 10, 11 along the optical path a, thereby allowing only the area A within the sample 2 to be spectrometrically measured. In this configuration, light source 1 produces infrared radiation incident upon sample 2. The infrared radiation is transmitted by sample 2 and focused by object lens 3 at focal point 4a after being reflected from mirrors 22 and 13. The infrared radiation produced by light source 1 may be subjected to energy intensity modulations M at every wavelength by a two-beam interference spectrometer, or the modulation can be avoided.

The masked image created at point 4a by masks 10 and 11 is reflected from the mirror 23 into the spectrometrical measurement system 8.

When the infrared radiation produced by light source 1 is not modulated, a frequency spectrum representative of the image is produced by a spectrometer within the spectrometric system 8 and displayed by display means 9. When the infrared radiation has been subjected to energy modulation M, the infrared portion to be measured is detected and subjected to frequency analysis to obtain the spectrum.

Figure 3:
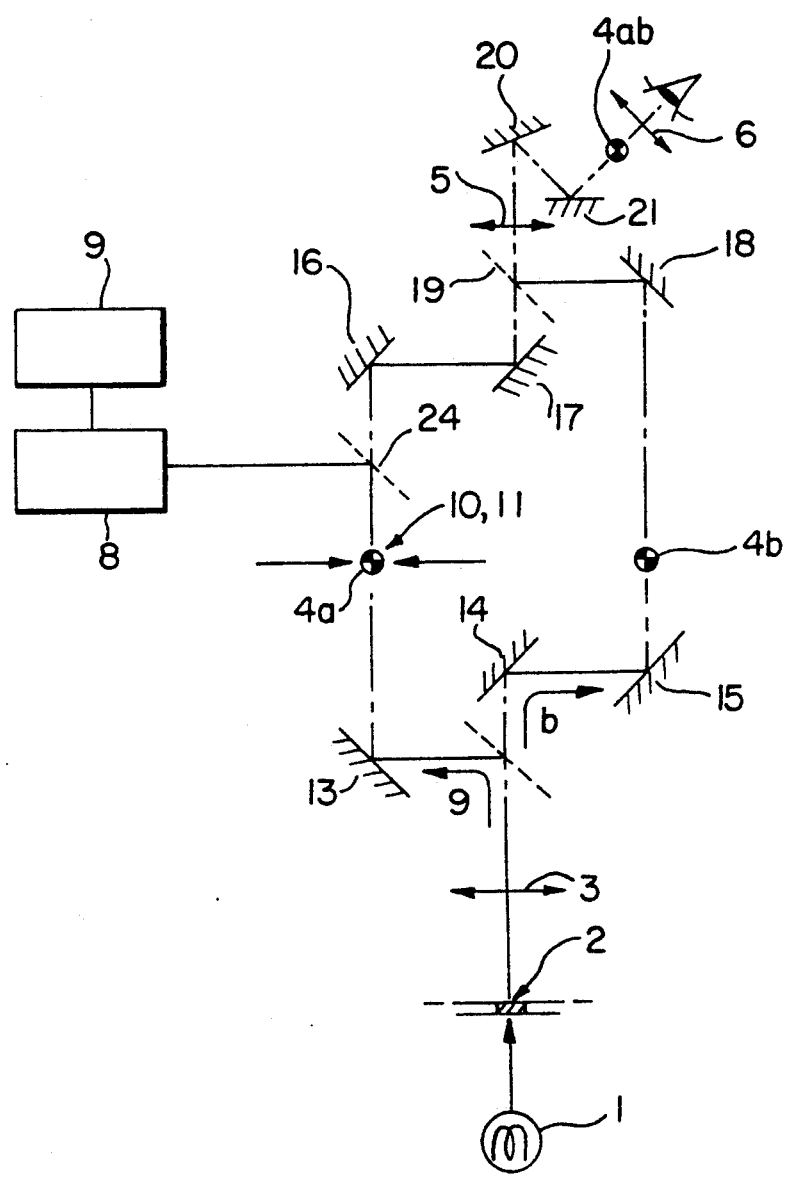
FIG. 3 is an illustration of an optical arrangement plan utilized by a second preferred embodiment of the present invention.
Figure 4:
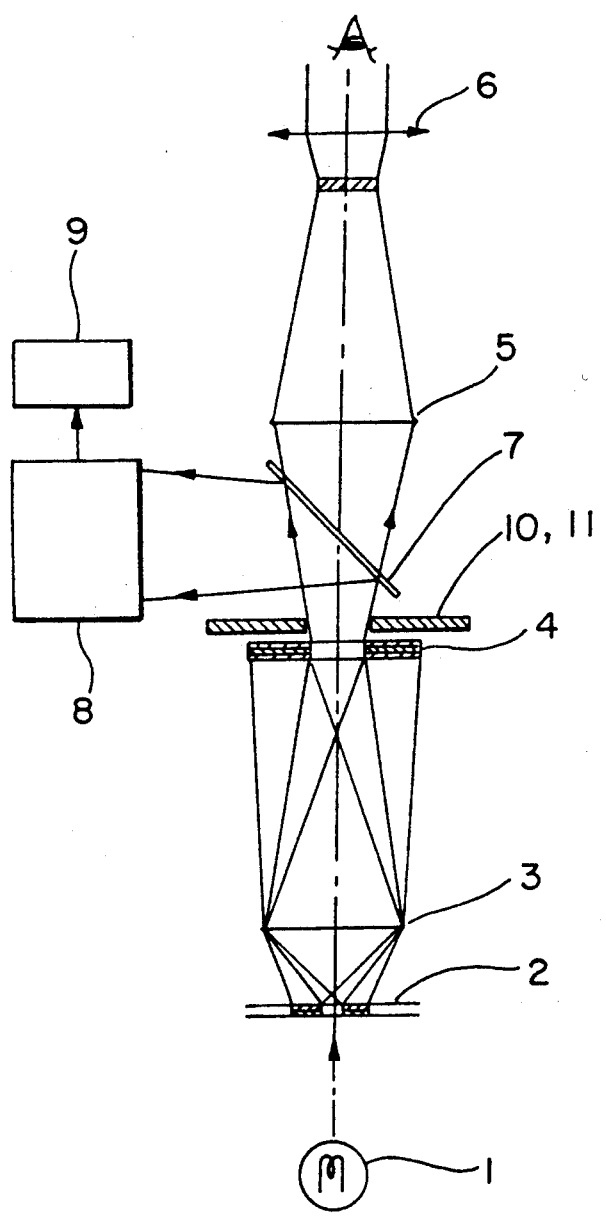
FIG. 4 is a block diagram showing a conventional microscopic spectrometer.
Figure 5:
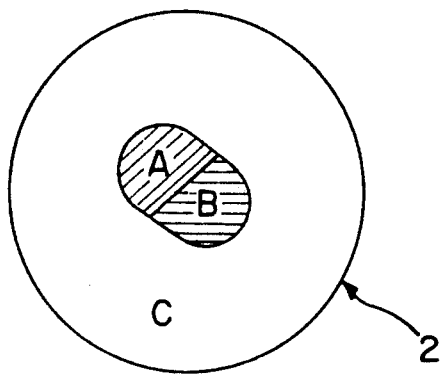
FIG. 5 is an illustration of a sample used in microscopic spectrometry.
Figure 6:
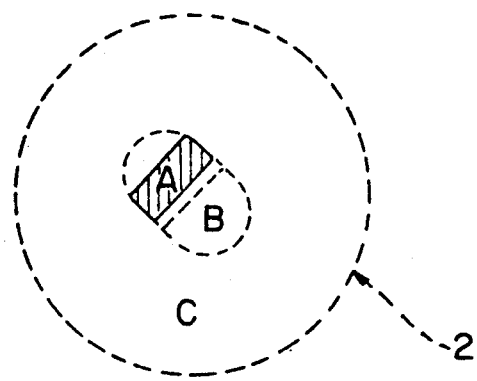
FIG. 6 is an illustration of a method of masking a sample.
Figure 7:
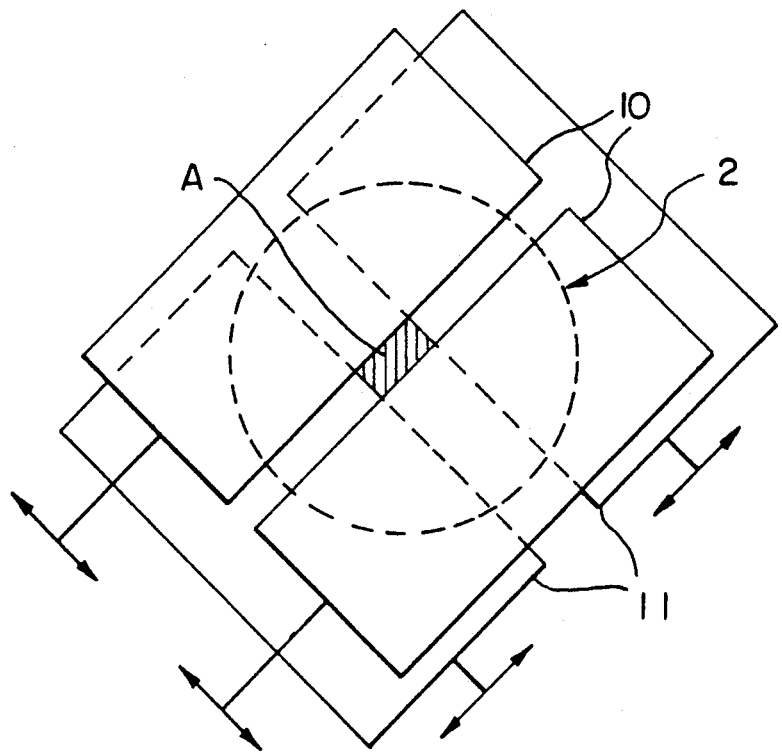
FIG. 7 is an illustration of a masked sample.

FIG. 3 illustrates a second preferred embodiment of the present invention. In FIG. 3 a light source 1, which is used in the measurement, produces light within the visible spectrum. The system illustrated in FIG. 3 is identical to the system illustrated in FIG. 1, with the exception that a beam splitter 24 is introduced along the optical path a and disposed after the image 4a is masked by masks 10, 11. The configuration illustrated in FIG. 3 eliminates the need for replacing beam splitter 12 with reflective mirror 22 and introducing mirror 23 when a measurement is to be made.

The configuration illustrated in FIG. 3 may be used with the light source 1 producing visible light, or may produce a modulated beam or a nonmodulated beam as discussed above. When measuring fluorescence or phosphorescence of a sample, however, it is suggested that the light source 1 produce a beam of constant intensity.

Although the preferred embodiment describes a transmission microscopic spectrometer, as shown in FIG. 1 it should be understood that the present invention can also be applied to a reflection microscopic spectrometer wherein light source $1_R$ reflects from a sample 2. As can be seen by the preferred embodiment, the time required for making spectrometric measurements can be greatly shortened, and highly accurate measurements can be made.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A microscopic spectrometer comprising:
   (a) a light source for projecting light upon a sample;
   (b) means for providing at least two optical paths from the light source, a first optical path including means for masking a portion of light from the sample to define a target area, and a second optical path providing a nonmasked image of the sample;
   (c) a spectrometrical measurement system for spectrometrically measuring the target area image passed through the means for masking in the first optical path; and
   (d) a visualizing means for producing a composite image of the sample and the target area images for observation by an operator including an eyepiece allowing view of a synthetic image created from a recombination of the first and second optical paths.

2. The apparatus of claim 1 wherein the means for creating at least two optical paths is a beam splitter.

3. The apparatus of claim 2 wherein a mirror is introduced into the first optical path to illuminate a spectrometric measurement system for making spectrometric measurements.

4. The apparatus of claim 2 wherein a beam splitter is introduced into the first optical path to illuminate a spectrometric measurement system for making spectrometric measurements.

5. The apparatus of claim 1 wherein the image produced by the visualizing means shows a representation of a position of the target area image created in the first optical path with respect to the sample.

6. The apparatus of claim 1 wherein means for emphasizing specific spectrometric characteristics are introduced into the optical paths.

7. The apparatus of claim 6 wherein the means for emphasizing specific spectrometric characteristics are filters.

8. The apparatus of claim 1 wherein light is reflected from the sample.

9. The apparatus of claim 1 wherein light is transmitted through the sample.

10. The apparatus of claim 1 wherein light produced by the light source is within the visible spectrum.

11. The apparatus of claim 1 wherein light produced by the light source is modulated.

12. The apparatus of claim 1 wherein light produced by the light source is not modulated.

13. A microscopic spectrometer comprising:
    a light source for projecting light upon a sample;
    means for dividing light from the sample into two separate images;
    an eyepiece;
    a first optical path for transmitting one image of the sample unobstructed to the eyepiece for observation by the operator;
    means for masking a portion of the other image of the sample to define a target area;
    a second optical path for transmitting the target area image to the eyepiece for providing a composite of the two images for observation by the operator;
    means for detecting the light transmitted through the target area; and
    means for directing the target area image from the second optical path to the detecting means.

14. The microscopic spectrometer of claim 13 wherein the first and second optical paths include a beam splitter optical element.

15. The microscopic spectrometer of claim 13 wherein the means for directing the target area includes a pair of total reflecting mirrors that are inserted into the second optical path.

16. The microscopic spectrometer of claim 15 wherein the means for masking includes a pair or relatively movable mask members.

17. The microscopic spectrometer of claim 16 wherein the light source is infrared radiation.

18. In a microscopic spectrometer having a light source for projecting light from a sample, the improvement comprising:
    means for dividing light from the sample into two separate images;
    an eyepiece;
    a first optical path for transmitting one image of the sample unobstructed to the eyepiece for observation by the operator;
    means for masking a portion of the other image of the sample to define a target area; and
    a second optical path for transmitting the target area image to the eyepiece for providing a composite of the two images for observation by the operator.

* * * * *